United States Patent
Borgsmüller et al.

(10) Patent No.: US 7,193,754 B2
(45) Date of Patent: Mar. 20, 2007

(54) METHOD FOR CALCULATING AND PRODUCING A COMPUTER-GENERATED HOLOGRAM AND ALSO A STORAGE MEDIUM WITH A COMPUTER-GENERATED HOLOGRAM AND A READING DEVICE

(75) Inventors: Stefan Borgsmüller, Heidelberg (DE); Kay Schulte-Wieking, Heidelberg (DE); Steffen Noehte, Weinheim (DE)

(73) Assignee: tesa scribos GmbH, Heidelberg (DE)

( * ) Notice: Subject to any disclaimer, the term of this patent is extended or adjusted under 35 U.S.C. 154(b) by 0 days.

(21) Appl. No.: 10/888,532

(22) Filed: Jul. 9, 2004

(65) Prior Publication Data
US 2005/0093856 A1    May 5, 2005

(30) Foreign Application Priority Data
Jul. 11, 2003   (DE) ................................ 103 31 737

(51) Int. Cl.
*G03H 1/00*   (2006.01)
(52) U.S. Cl. ............................. 359/2; 359/24; 359/29; 359/900
(58) Field of Classification Search ............... 359/569, 359/24, 900
See application file for complete search history.

(56) References Cited

U.S. PATENT DOCUMENTS

| | | | |
|---|---|---|---|
| 4,129,382 A | 12/1978 | Greenaway et al. | |
| 4,171,864 A | 10/1979 | Jung et al. | |
| 5,909,313 A * | 6/1999 | Lee | 359/569 |
| 6,865,001 B2 * | 3/2005 | Long et al. | 359/2 |

FOREIGN PATENT DOCUMENTS

WO   WO 94/06097   3/1994

\* cited by examiner

*Primary Examiner*—Fayez G. Assaf
(74) *Attorney, Agent, or Firm*—Proskauer Rose LLP

(57) ABSTRACT

The invention relates to a method for calculating a computer-generated hologram, in which the pixel distribution of the computer-generated hologram is calculated, in which the pixel distribution of a macroscopic superstructure is calculated and in which the pixel distribution of at least one computer-generated hologram is interconnected with the pixel distribution of the macroscopic superstructure to form a pixel distribution to be written in a storage medium. Similarly, the invention relates to a method for writing the hologram, a storage medium and also a reading device. Therefore, both a computer-generated hologram and a macroscopic superstructure which can contain directly readable information can be brought together in a pixel distribution.

28 Claims, 18 Drawing Sheets desired reconstruction dot matrix information hologram for the desired
reconstruction as shown in Figure 6a combination of hologram (Figure 6c)
and dot matrix information (Figure 6b)

reconstruction of the hologram as
shown in Figure 6c reconstruction of the hologram
as shown in Figure 6d optimized hologram reconstruction of the hologram
as shown in Figure 6g desired reconstruction dot matrix information hologram for the desired reconstruction as shown in Figure 7a combination of hologram (Figure 7c) and dot matrix information (Figure 7b)

reconstruction of the hologram as shown in Figure 7c reconstruction of the hologram as shown in Figure 7d optimized hologram reconstruction of the hologram as shown in Figure 7g

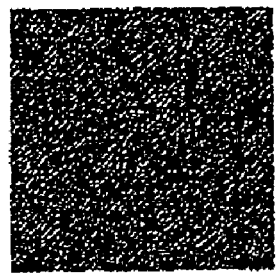
hologram 1
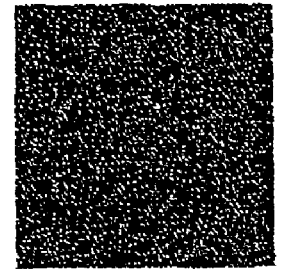
hologram 2
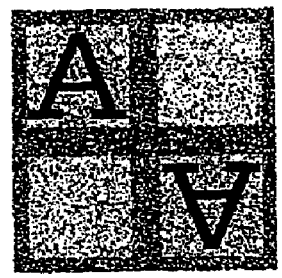
reconstruction 1
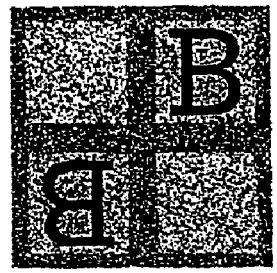
reconstruction 2
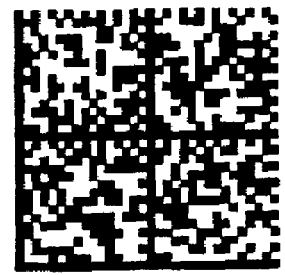
dot matrix information
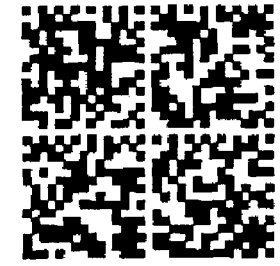
dot matrix information inverted
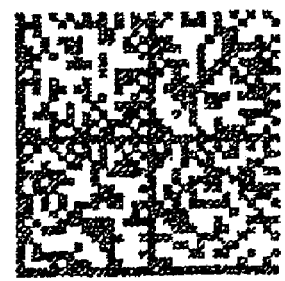
combination 1 of hologram 1 and dot matrix information
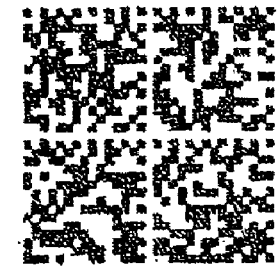
combination 2 of hologram 2 and inverted dot matrix information
Fig. 8a
Fig. 8b
Fig. 8c
Fig. 8d
Fig. 8e
Fig. 8f
Fig. 8g
Fig. 8h reconstruction of combination 1 reconstruction of combination 2 overall combination of combination 1 and combination 2 reconstruction of the overall combination optimized hologram 1 optimized hologram 2 reconstruction of the optimized hologram 1 reconstruction of the optimized hologram 2 combination of the optimized
holograms 1 and 2 reconstruction of the
combination from Figure 8q twice-optimized combination of
the holograms 1 and 2 reconstruction of the twice-optimized
combination from Figure 8s part corresponding to the
first combination of the
twice-optimized hologram reconstruction of the part from Figure 8u part corresponding to the second combination of the twice-optimized hologram reconstruction of the part from Figure 8w "normal" hologram reconstruction of the normal hologram

METHOD FOR CALCULATING AND PRODUCING A COMPUTER-GENERATED HOLOGRAM AND ALSO A STORAGE MEDIUM WITH A COMPUTER-GENERATED HOLOGRAM AND A READING DEVICE

BACKGROUND OF THE INVENTION

The invention relates to a method for calculating and producing a computer-generated hologram and also a storage medium with a computer-generated hologram and a reading device.

Computer-generated holograms are two-dimensional holograms which comprise individual pixels with different optical properties and from which images and/or data are reproduced by diffraction when they are illuminated with a coherent electromagnetic wave, in particular a light wave, in transmission or reflection. The different optical properties of the individual pixels may be reflection properties, for example as a result of surface topography, varying optical path lengths in the material of the storage medium (refractive index) or color values of the material.

The optical properties of the individual pixels are calculated by a computer, so they are so-called computer-generated holograms (CGH). With the aid of a focused writing beam, the individual pixels of the hologram are written into the material of the storage medium during the writing of the hologram, the focus lying in the region of the surface or in the material of the storage medium. Focusing brings about a small area of action on the material of the storage medium in the region of the focus, so that a large number of pixels of the hologram can be written in a small region. The optical property of the pixel respectively written in this case depends on the intensity of the writing beam. For this purpose, the writing beam is scanned in two dimensions with varying intensity over the surface of the storage medium or within the volume, for example in a layer provided with a transparent protection. The modulation of the intensity of the writing beam takes place in this case either by means of an internal modulation of the light source, for example a laser diode, or by means of an external modulation of a writing beam outside the light source, for example with the aid of optoelectronic elements. In addition, the light source may be formed as a pulsed laser, the pulse lengths of which can be controlled, so that control of the pulse energy of the writing beam can take place on the basis of the pulse lengths.

Consequently, the scanning of the intensity-modulated writing beam produces one or more areas with an irregular pixel distribution, the computer-generated hologram or holograms. This can be used for identifying and individualizing any objects desired.

Scanning lithographic systems for producing computer-generated holograms are known per se. Both laser-lithographic and electron-beam lithographic systems are meant here, or other lithographic systems. Laser-lithographic systems are capable of achieving a resolution of approximately 25,000 dpi on an area of 1 to 25 mm². The writing speed is approximately 1 Mpixel/s, so that in each case a hologram can be written in a time of about 1 s.

Each computer-generated hologram can be read out only with the aid of a reading beam; the surface of the hologram itself has no directly visible and perceptible information. For this reason, it has so far been difficult to introduce and popularize computer-generated holograms in application areas in which information which can be read out directly, for example 1D or 2D barcodes, has been used. This is because a system change from one reading technique to another new reading technique always requires a transitional period in which both applications can be used simultaneously. The invention is therefore based on the technical problem of further improving the calculation and production of a computer-generated hologram, so that a combination with directly perceptible images in the structure of the pixel distribution is made possible. Similarly, the technical problem is that of providing a storage medium which can be provided with a combined pixel distribution, and also of providing a corresponding reading device.

SUMMARY OF THE INVENTION

According to a first teaching of the present invention, the technical problem presented above is solved by a method for calculating a computer-generated hologram in which the pixel distribution of the computer-generated hologram is calculated, in which the pixel distribution of a macroscopic superstructure is calculated and in which the pixel distribution of the computer-generated hologram is interconnected with the pixel distribution of the macroscopic superstructure to form a pixel distribution to be written in a storage medium.

According to a second teaching of the present invention, the technical problem is solved by a method for producing a computer-generated hologram in a storage medium in which the computer-generated hologram according to the first teaching of the invention is calculated, in which a writing beam is focused on the storage medium and is moved two-dimensionally in relation to the storage medium and in which the pixel distribution to be written is written by introducing radiation energy on a point by point basis, the intensity of the writing beam being controlled in dependence on the position of the writing beam on the storage medium.

In this case, the writing beam may be moved in relation to the fixed storage medium or the storage medium is moved in relation to the writing beam, with the writing beam fixed.

According to the invention, it has therefore been recognized that both a computer-generated hologram and a macroscopic superstructure which can contain directly readable information can be brought together in a pixel distribution.

One advantage is that both conventional barcode readers and readers for computer-generated holograms can be used.

At the same time, a barcode can also be given additional functions. The barcode has in itself no security aspects, but the inseparable combination with the computer-generated hologram has the effect that an authentication feature is integrated.

The combination of the computer-generated hologram with a macroscopic superstructure offers various possibilities of combinations of properties of the computer-generated hologram, the type of interconnection and the macroscopic superstructure, a hologram type always being combined with a macroscopic superstructure by means of an interconnection.

On the one hand, various types of computer-generated holograms can be used. These are, for example, all computer-generated Fourier, kinoform and Fresnel holograms as various hologram types to be combined.

On the other hand, 1D or 2D barcodes, microinscriptions, images, logos or coded matrices may be used as macroscopic superstructures. Coded matrices are two-dimensional data bit arrays, it being possible for the coding and/or arrangement of the data bits to assume any forms desired.

Decisive for the form taken by the pixel distribution to be written into the storage medium is the type of interconnection.

In a preferred way, a logic operation is used for the interconnection between the pixel distribution of the computer-generated hologram and the pixel distribution of the macroscopic superstructure. In particular, one of the following logic operations is used: an AND, NAND, OR or NOR operation.

This means for example that a pixel to be written that is contained in the computer-generated hologram is only written if this pixel is also contained in the macroscopic superstructure. In other words, the interconnection may be realized by a pixel being set in the pixel distribution to be written if a pixel is present at the same position both in the pixel distribution of the computer-generated hologram and in the pixel distribution of the macroscopic superstructure (AND operation).

Similarly, it may also be provided that a pixel to be written that is contained in the computer-generated hologram is not written if this pixel is also to be written in the macroscopic superstructure. In other words, the interconnection may be realized by a pixel being omitted from the pixel distribution to be written if this pixel is present in the pixel distribution of the macroscopic superstructure. The pixel distribution of the macroscopic superstructure then appears as a negative image in the pixel distribution to be written (NAND operation).

Similarly, it is possible for example to set a pixel in the pixel distribution to be written if a pixel is present at the same position either in the pixel distribution of the computer-generated hologram or in the pixel distribution of the macroscopic superstructure (OR operation).

Similarly, the interconnection may be realized by a pixel being omitted from the pixel distribution to be written if a pixel is present at the same position either in the pixel distribution of the computer-generated hologram or in the pixel distribution of the macroscopic superstructure (NOR operation).

The logic operations mentioned above may also be realized by the pixels which would be omitted or set according to the logic operation being written with various intensity (gray scale values). For example, the pixels set according to logic operation may be written with a full gray scale value and the omitted pixels written with a lower gray scale value. As a result, although the contrast of the macroscopic superstructure is reduced, the quality of the reconstruction of the hologram is increased.

Independently of a logic operation, the interconnection may also be realized by the pixel distribution of the computer-generated hologram having a first preferred angular alignment, by the pixel distribution of the macroscopic superstructure having at least a second preferred angular alignment and by the pixel distribution of the hologram at the regions filled by the pixel distribution of the higher-level structure being replaced by the latter. This produces regions with different preferred angular alignment, part of which represents the computer-generated hologram, while the other part contains the macroscopic superstructure, that is to say information which can be read out directly.

In a further preferred way, the pixel distribution of the macroscopic superstructure may itself contain a computer-generated hologram, so that, apart from the first computer-generated hologram and the macroscopic superstructure, a further item of holographic information is contained in the pixel distribution. As a result, the depth of the coding of the information contained in the pixel distribution can be increased once again.

Furthermore, it is preferred that the pixel distribution of the macroscopic superstructure is calculated as a computer-generated dot matrix hologram and that the pixel distribution of the hologram at the regions filled by the pixel distribution of the higher-level structure is replaced by the latter as the interconnection.

A computer-generated dot matrix hologram is understood as meaning a dot matrix hologram in which the diffraction gratings of the individual dots are not produced by two laser beams being superposed in the material of the storage medium, but in which the diffraction gratings are respectively formed by a grid of points within a larger pixel distribution. Therefore, computer-generated dot matrix holograms can be combined in a simple way with the pixel distribution of a computer-generated hologram, since both can be calculated and written on the basis of one pixel distribution.

In this case, the structure of the computer-generated dot matrix hologram is preferably produced by different forms or grating structures of the individual dots.

In the case of the interconnections described above, the pixel distribution to be written contains on the one hand regions in which the pixel distribution of the computer-generated hologram is present, and on the other hand regions in which the pixel distribution of the macroscopic superstructure is present. There may also be regions in which the two different pixel structures exist alongside each other or one on top of the other. Consequently, the computer-generated hologram can be read out by means of a reading beam, albeit with reduced quality, while at the same time the macroscopic superstructure is perceptible in a directly readable manner in the pixel distribution to be written.

The application with a macroscopic superstructure in the form of a 1D or 2D barcode is particularly advantageous, since existing systems set up for the application of barcodes can be converted step-by-step for an application of computer-generated holograms, or the barcode embedded in the hologram can be read directly from the outset. This is so because, during a transitional time, labels which have the computer-generated hologram combined with the macroscopic superstructure in the form of a barcode can be read out both on the basis of the barcode and on the basis of the holographic information. The labels therefore make downward compatibility between various systems possible.

A further preferred refinement of the invention relates to a time-delayed writing of different parts of the pixel distribution. The method consists in that at least two different dot matrix holograms are written in the storage medium at different points in time. Consequently, the storage medium can also be given further informational contents at a later point in time. As an application, mention may be made of a holographic form, in which an existing hologram with first items of information (form) has further data (entries in the form) added to it at a later point in time.

In the case of a further refinement of the present invention, an optimization process is used for improving the quality of the reconstruction. An iterative Fourier transformation algorithm, preferably a gradual and random binarization algorithm, is used for the optimization of the pixel distribution.

For this purpose, a quantization operation is used at the level of the pixel distribution of the hologram, i.e. a gray scale value distribution is assigned to quantized and defined gray scale values. The preferred variant consists in binary quantization, that is assignment in black and white values.

Furthermore, a clipping of the pixel distribution to the intended form within the entire pixel distribution may be performed in the optimization at the level of the pixel distribution of the hologram. In one of the examples described above, the pixel distribution of the hologram is therefore reduced to the binary form of a 2D barcode and included in the calculation or optimization of the hologram. The loss of information associated with the removal of partial regions of a ready calculated hologram is considerably reduced as a result.

In the optimization, furthermore, at the level of the reconstruction, the reconstruction obtained can be replaced by the desired reconstruction. Consequently, the optimum information is inserted by the subsequent back-calculation during the next iteration step.

It is particularly preferred that the optimized composed pixel distribution from at least two different holograms is optimized once again by an iterative Fourier transformation algorithm, the entire pixel distribution being assumed at the level of the pixel distribution and the reconstruction of the combination being assumed at the level of the reconstruction. This produces a doubly optimized pixel distribution.

According to a third teaching of the present invention, the technical problem presented above is solved by a storage medium with at least one region into which a pixel distribution is written, the pixels of the pixel distribution having a changed optical property of the material of the storage medium in comparison with the original state and the pixel distribution having been produced by a method according to the second teaching of the invention.

According to a fourth teaching of the present invention, the technical problem presented above is solved by a device for reading out a hologram stored in a storage medium according to the third teaching of the present invention, with a radiation source for producing a reading beam of electromagnetic radiation, with the storage medium arranged in the path of rays of the reading beam, the reading beam at least partly illuminating the surface area taken up by the hologram, and with recording means for recording the image produced by the hologram, wherein an optical system is provided for capturing the macroscopic superstructure of the pixel distribution of the surface area taken up by the hologram.

By this device it is made possible to read out a pixel distribution which on the one hand contains an item of holographic information and on the other hand has a macroscopic superstructure which can be read directly. The different items of information are recorded by the separate recording means and passed on for separate evaluation.

In a first preferred embodiment, the optical system has imaging optics and second recording means. The imaging optics are intended for forming an image of the pixel distribution of the surface area taken up by the hologram and the second recording means are intended for recording the pixel distribution. Consequently, the macroscopic superstructure can be recorded by the optical system at least in partial regions, but preferably altogether, in order for example to capture the image, the pattern (2D barcode) or the microinscription completely.

Furthermore, it is preferred that the first recording means have at least two recording regions, which are separate from each other, for recording at least two different images of the hologram. This allows two different items of holographic information which are contained in the pixel distribution to be recorded simultaneously but separately. This makes it possible for the various items of holographic information to be assigned to different security stages. For example, only the first item of holographic information may be accessible to a first security stage and both items or only the second item of holographic information accessible to a second security stage.

This makes it possible to write in various items of information at separate times; this means that, after undergoing a first writing operation, a data carrier can have further information, that is storage contents, added to it later. This makes it possible to record the different items of information by exposure with different diffraction structures and consequently to separate them in the reconstruction, spatially or in the resolution.

An example of a pixel distribution for this application is that a 2D barcode is chosen as the macroscopic superstructure, the dark regions being provided with a first computer-generated hologram and the light regions being provided with a second computer-generated hologram. This example of such a computer-generated hologram is explained in more detail further below.

In a further preferred refinement of the reading device, the optical system has a second radiation source for producing a second reading beam of electromagnetic radiation, a beam splitter arranged in the path of rays of the second reading beam and a light-sensitive detector. The beam splitter is intended for deflecting the reflected radiation onto the light-sensitive detector. This configuration is suitable for making the storage medium pass by the reading beam.

Furthermore, a scanning device may be provided for scanning the second reading beam over the pixel distribution of the surface area taken up by the hologram. In this way, even fixed storage media can then be scanned.

A typical pixel distribution which can be read with this configuration has at least one region with a computer-generated hologram and, as a macroscopic superstructure, a 1D barcode. This device may also be referred to as a combination of a device for reading out a computer-generated hologram and a 1D barcode scanner.

BRIEF DESCRIPTION OF THE DRAWINGS

The invention is explained in more detail below on the basis of exemplary embodiments, reference being made to the accompanying drawing, in which.

DETAILED DESCRIPTION OF THE INVENTION

Represented in FIGS. 1a to 1g is a series of illustrations with the aid of which a first refinement of the method according to the invention for calculating a hologram is explained.

Figure 1A:
FIGS. 1a–g show a number of illustrations to explain the method according to the invention for calculating a computer-generated hologram for a combination of a hologram having a logo and text with a macroscopic superstructure containing a photograph, FIGS. 2a,b show a microscopic recording of a pixel distribution comprising an interconnection of a computer-generated hologram with a macroscopic superstructure in the form of a photograph and also a reproduction of the hologram.

FIG. 1a shows a normal black and white photograph, which is composed of many picture elements or pixels. From this picture, the pixel distribution of the macroscopic superstructure is calculated below.

Figure 1B:

FIG. 1b shows a rastered representation of the image content of the photograph, it being possible for example to use Floyd-Steinberg dithering. From the original gray scale image, a rastering of black and white points corresponding to the pixel distribution of the macroscopic superstructure has been obtained. When reduced in size, this superstructure reveals an image which corresponds to the original image according to FIG. 1a.

Figure 1C:
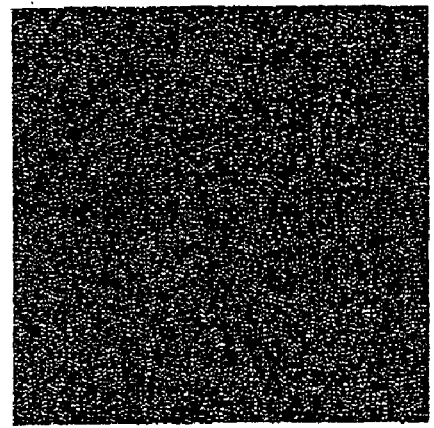
Figure 1D:
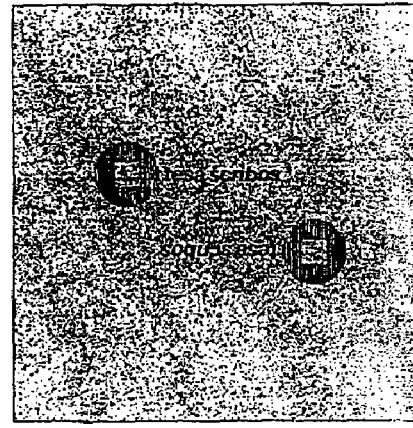

FIG. 1c shows the pixel distribution of a computer-generated hologram in which a logo and text have been processed. FIG. 1d shows a reconstruction of the hologram according to FIG. 1c with sharp contrasts and low background noise.

Figure 1E:

FIG. 1e shows the result of a NAND operation on the pixel distribution of the computer-generated hologram according to FIG. 1c with the pixel distribution of the macroscopic superstructure according to FIG. 1b. In the case of the NAND operation, the black points represented in FIG. 1b are omitted in the pixel distribution according to FIG. 1e, even if the pixel distribution of the computer-generated hologram has provided black points at this location.

As a result, a pixel distribution which on the one hand shows a negative representation of the macroscopic superstructure and on the other hand shows the irregular structure typical of a computer-generated hologram is obtained. This structure is also clear in FIG. 1g, in which a detail taken from FIG. 1e is shown enlarged.

It is also clear from this why the rastering of the gray scale image is chosen to be on the coarse side for the pixel distribution of the macroscopic superstructure. This is so because the portions of the computer-generated hologram that have a diffraction structure must not be divided up too much, atomized as it were, in order that continuous portions with an adequately large diffraction grating remain in the pixel distribution to be written into a storage medium. This is so because the effect of the diffraction structures is lessened if the computer-generated hologram is divided up into partial regions that are too small.

Figure 1F:
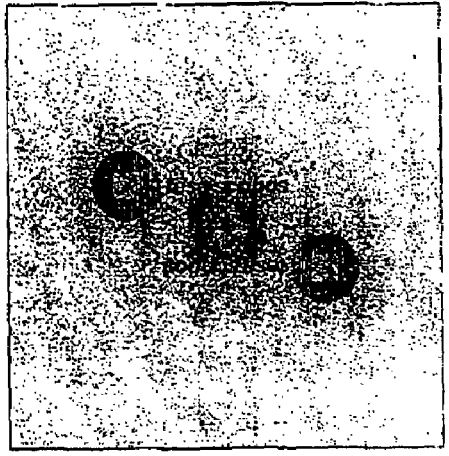

Finally, FIG. 1f shows the reconstruction of the hologram contained in the pixel distribution according to FIG. 1e. In comparison with FIG. 1d, it reveals a weaker contrast and stronger background noise, which is explained by the loss of information as a result of the interconnection with the macroscopic superstructure. Nevertheless, the quality of the reconstruction is quite adequate for an evaluation.

Figure 1G:
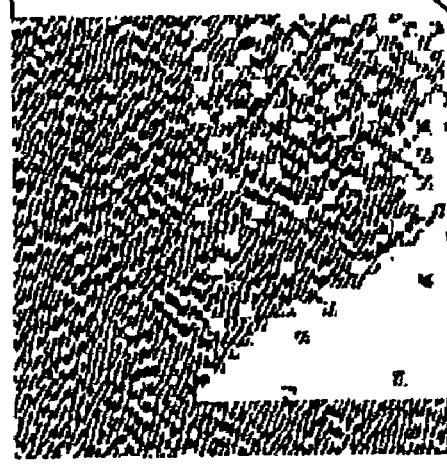

As represented in FIG. 1e and enlarged in FIG. 1g, the pixels of the pixel distribution have been written in a binary distribution. As a result, in the regions the pixels of the illustration have been omitted and white areas which do not contain any holographic information are produced.

In the case of a further refinement of the invention, the pixels of the pixel distribution are exposed in a gray scale value distribution. This makes it possible to provide the areas which are white in FIGS. 1e and 1g with a gray-value holographic pattern. As a result, on the one hand it is ensured that the hologram reproduced has a better quality, since the number of pixels carrying the holographic information is increased, and since on the other hand the illustration continues to be perceptible—albeit a little blurred.

FIG. 2 shows a further exemplary embodiment of an interconnection of a computer-generated hologram with a macroscopic superstructure in the form of a photo. This is the same photograph as in FIG. 1a.

Figure 2A:

FIG. 2a shows a microscopic recording of this pixel distribution, which has been calculated and produced by an AND operation from a computer-generated hologram and a macroscopic superstructure in the form of a photo. A very high-contrast illustration of the photo can be seen. By contrast with the representation in FIG. 1e, the photograph is represented as a positive. In comparison with FIG. 1b, the rastering is considerably finer, so that more image information of the macroscopic superstructure is retained.

Figure 2B:
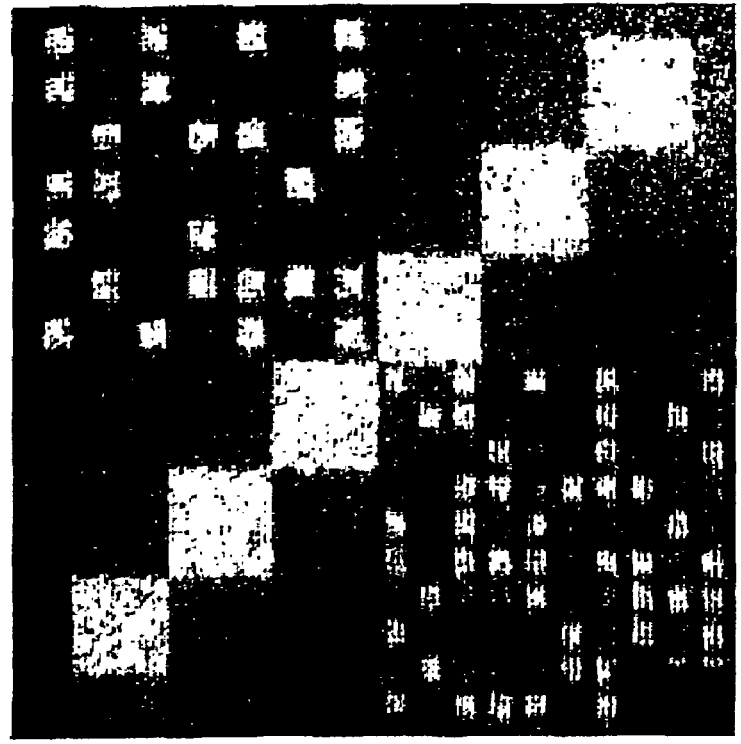

On the other hand, the structure of the computer-generated hologram can only be seen in the outer regions of the illustration by the irregular diffraction grating structure. Nevertheless, on account of the AND operation, the entire range of the pixel distribution of the computer-generated hologram is arranged in a distributed manner. This can be seen from the reconstruction of the hologram that is represented in FIG. 2b offering adequate contrast, so that the data bit arrays contained can easily be evaluated. The contrast and the locational resolution are in this case less than in the case of the reconstruction shown in FIG. 1f. The low resolution is caused by the finer rastering of the macroscopic superstructure, but the reconstruction is adequate for the holographic informational content represented in FIG. 2b.

A similar sequence of illustrations as in FIG. 1 is represented in FIGS. 3a to 3i. In the case of this exemplary embodiment, a second refinement of the method according to the invention for calculating a hologram is explained.

Figure 3A:
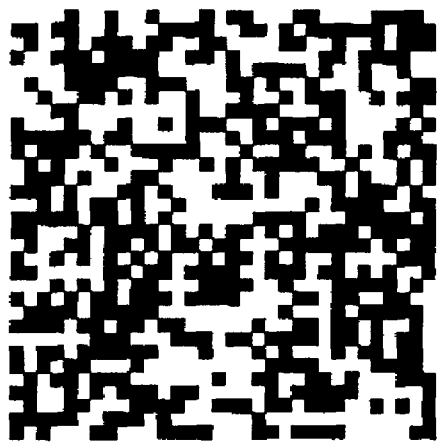
FIGS. 3a–i show a number of illustrations to explain the method according to the invention for calculating a computer-generated hologram for a combination of two holograms having a logo and text with a macroscopic superstructure containing a 2D barcode, FIGS. 4a,b show a microscopic recording of a pixel distribution comprising an interconnection of a computer-generated hologram with a macroscopic superstructure in the form of a 2D barcode and also a reproduction of the hologram.

FIG. 3a shows a pixel distribution of a 2D barcode, which is composed of many pixels. Every square of the barcode comprises a multiplicity of pixels, for example every square is composed of 25×25 pixels.

Figure 3B:
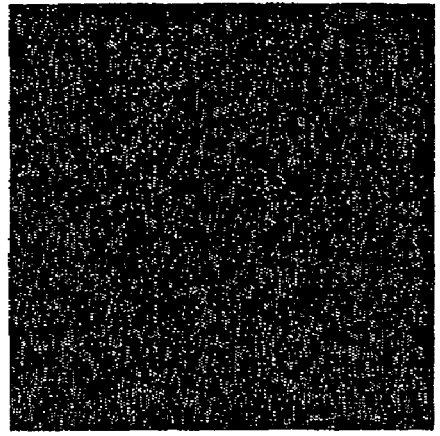
Figure 3C:
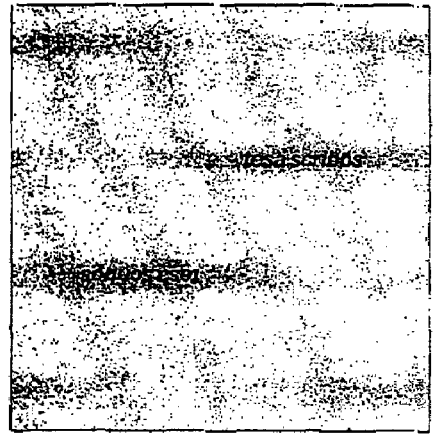

FIG. 3b shows the pixel distribution of a first computer-generated hologram, in which a text has been processed. The pixel distribution of the first computer-generated hologram has a first preferred angular alignment. FIG. 3c shows a reconstruction of the hologram according to FIG. 3b with sharp contrasts and low background noise.

Figure 3D:
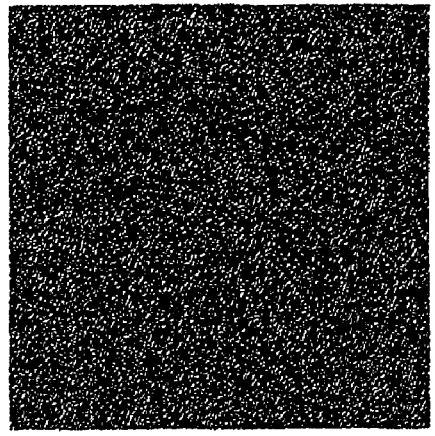
Figure 3E:

FIG. 3d shows the pixel distribution of a second computer-generated hologram, in which a logo has been processed. The pixel distribution of the second computer-generated hologram has a second preferred angular alignment. FIG. 3e shows a reconstruction of the hologram according to FIG. 3d, likewise with sharp contrasts and low background noise.

Figure 3F:
Figure 3G:
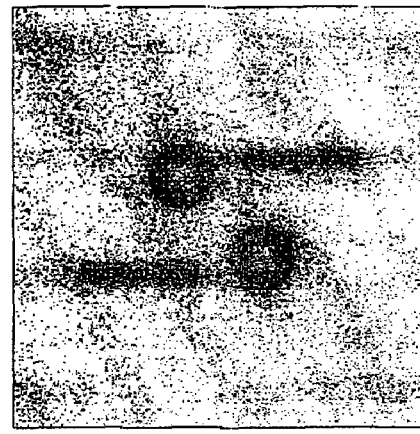

FIG. 3f shows the result of the interconnection of the pixel distributions of the two computer-generated holograms according to FIGS. 3b and 3d with the pixel distribution of the macroscopic superstructure according to FIG. 3a. Here, the pixel distribution of the first computer-generated hologram at the black squares of the 2D hologram of the macroscopic superstructure is replaced by the corresponding pixel distribution of the second computer-generated hologram. Consequently, the macroscopic superstructure in the pixel distribution represented in FIG. 3f has a second preferred angular alignment with respect to the first preferred angular alignment of the first computer-generated hologram.

In other words, the pixel distribution of the first computer-generated hologram is replaced at the regions filled by the pixel distribution of the macroscopic superstructure. Moreover, the pixel distribution of the macroscopic superstructure itself has a computer-generated hologram, in the present case the second computer-generated hologram.

Figure 3H:
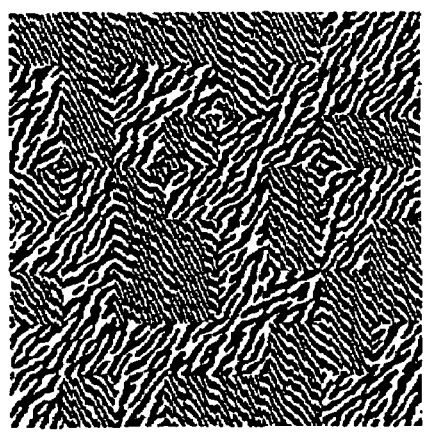
Figure 3I:
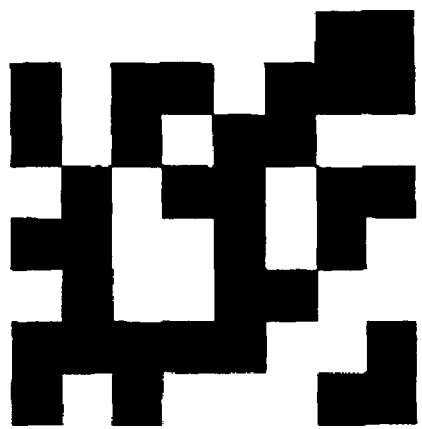

FIG. 3h shows the region of the pixel distribution outlined in FIG. 3f in an enlarged representation, the corresponding detail taken from the 2D barcode according to FIG. 3a being represented alongside it as FIG. 3i for direct comparison. A comparison shows that the squares of the barcode that are shown black in FIG. 3i have the pixel distribution of the second computer-generated hologram according to FIG. 3d, while the squares that are white in FIG. 3i have the pixel distribution of the first computer-generated hologram.

Consequently, altogether three different items of information, separate from one another, are contained in the pixel distribution. On the one hand, the macroscopic superstructure, which can be seen from an overall view of FIG. 3f. In particular under oblique illumination, the regions with lines running at different angles can clearly be separated from one another. On the other hand, in the pixel distribution there are two different items of holographic information, as is evident from the reconstruction represented in FIG. 3g. This is so because both the reconstruction of the text embedded in the first hologram and the reconstruction of the logo embedded in the second hologram can be seen offset from each other in FIG. 3g.

In comparison with FIGS. 3c and 3e, a weaker contrast and stronger background noise can be seen, to be explained by the loss of information as a result of the interconnection with the macroscopic superstructure or by the division into two different computer-generated holograms. Nevertheless, the quality of the reconstruction is quite adequate for an evaluation.

FIG. 4 shows an exemplary embodiment of an interconnection of a computer-generated hologram with a macroscopic superstructure in the form of a 2D barcode.

Figure 4A:
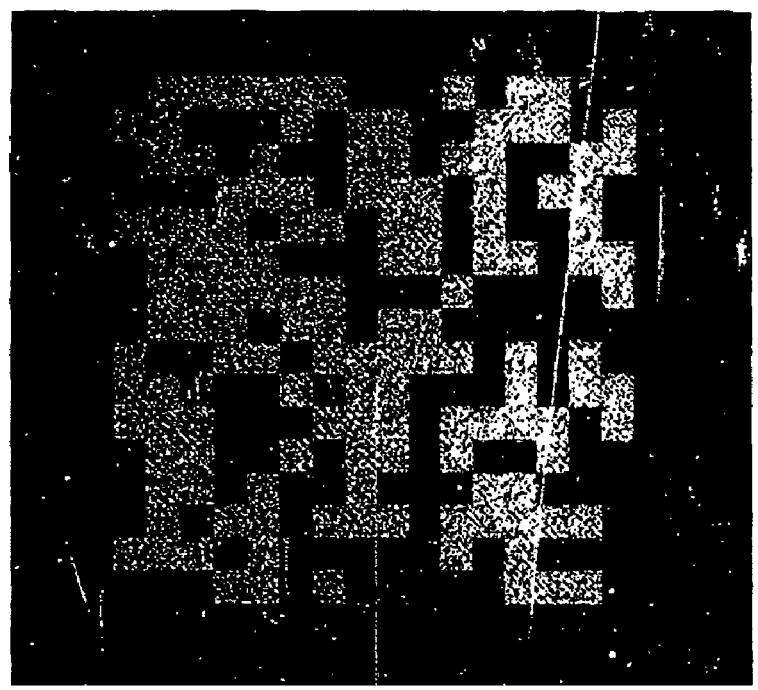

FIG. 4a shows a microscopic recording of this pixel distribution, which has been calculated by an AND operation from a computer-generated hologram and a macroscopic superstructure in the form of a 2D barcode. The 2D barcode is clearly evident, mainly from the black regions, which are dark in the representation, while the lighter regions do not have a uniform coloration, but have the structure of the computer-generated hologram.

By recording the barcode, the information contained in it can be evaluated directly by a machine. This corresponds to the normal use of a barcode.

Figure 4B:
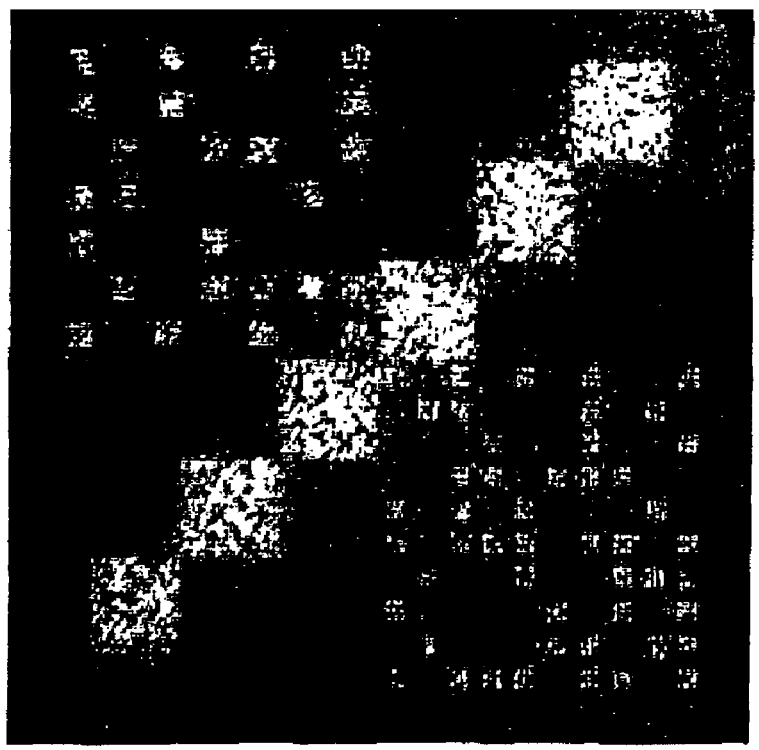

In addition, the holographic information arranged in the lighter regions in the pixel distribution can be read out by means of a reading beam, preferably a laser beam. FIG. 4b shows the corresponding information.

The pixel distribution represented in FIG. 4a consequently has two different informational contents. On the one hand, the 2D barcode represented in FIG. 4a has a directly visible pattern and the holographic information, which can only be made visible by reading out, for example with the aid of a laser beam. The reproduced computer-generated hologram represented in FIG. 4b contains in the top left-hand corner and in the bottom right-hand corner a digital data field.

Consequently, a combination of different coding stages is obtained within the same pixel distribution, which can be advantageously used for checking the authenticity of the information of the dot matrix hologram that can be read directly.

FIG. 5 likewise shows a combination of various diffraction structures within a pixel distribution.

Figure 5A:
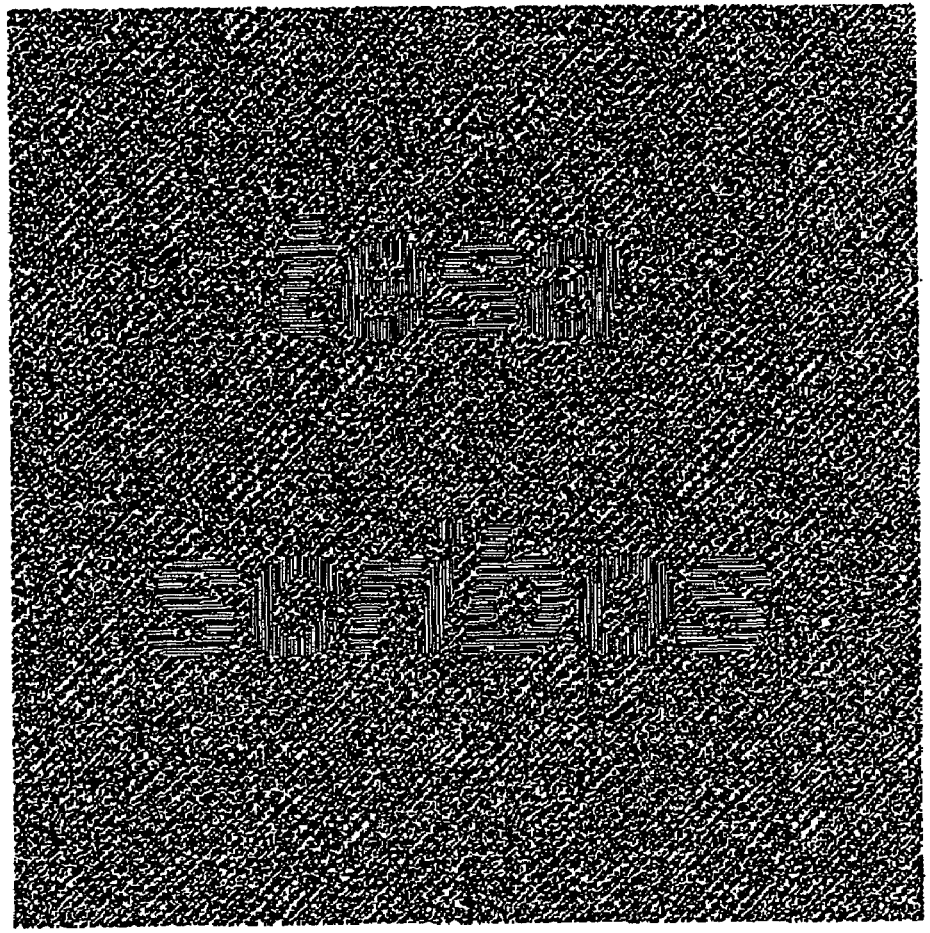
FIGS. 5a–c show an exemplary embodiment of a pixel distribution and also a microscopic recording of the pixel distribution comprising an interconnection of a computer-generated hologram with a macroscopic superstructure in the form of a computer-generated dot matrix hologram of a microinscription and also a reproduction of the hologram.

FIG. 5a shows the pixel distribution in which a background with an irregular diffraction structure running obliquely from bottom left to top right is provided. Furthermore, a sequence of letters is contained in the pixel distribution, the surface areas of the letters alternately having a regular diffraction pattern with vertically or horizontally running diffraction lines.

The individual letters may on the one hand be understood as a whole as dots of a computer-generated dot matrix. On the other hand, it may also be assumed that each letter is composed of a multiplicity of smaller dots, which in each case are directly adjacent to one another and have diffraction gratings merging into one another. In any case, however, a computer-generated dot matrix hologram is obtained, in the present case bearing the image of a microinscription.

Figure 5B:
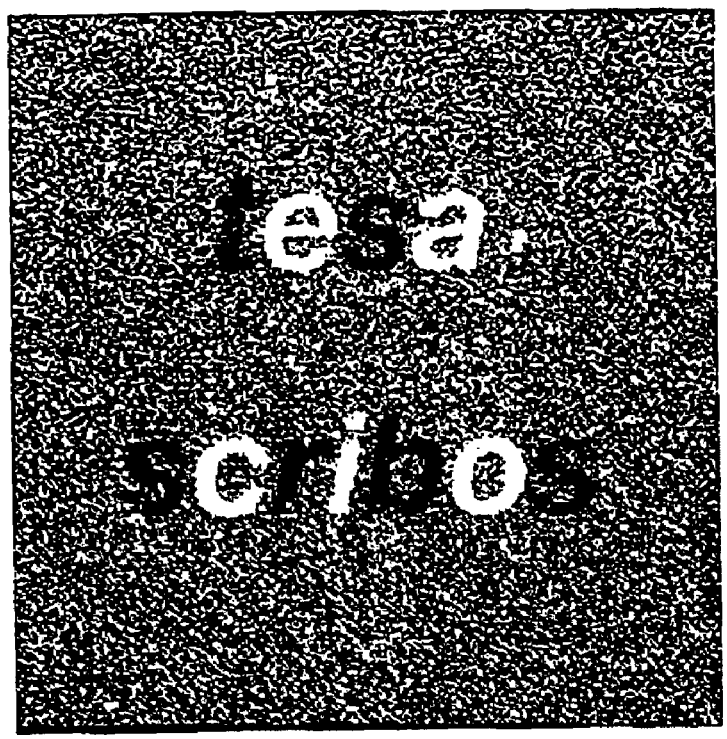

In FIG. 5b, a recording of the pixel distribution is represented. As a result of the different diffraction effects of the various surface areas, the background has an irregularly gray color, while the letters appear alternately white and black. The reason for the latter is that the incident light is on the one hand diffracted preferably in the direction of observation and on the other hand is not diffracted, or only very slightly, in the direction of observation.

Therefore, the typical effect of a dot matrix hologram is obtained, that different regions with a different diffraction effect appear in different colors and/or brightnesses when observed directly. The microinscription is therefore clearly perceptible.

Figure 5C:
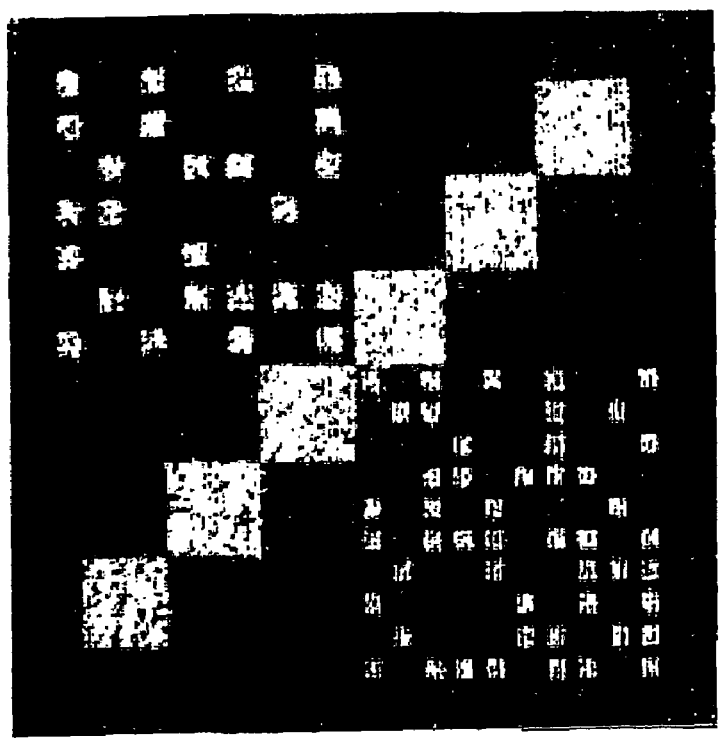

In addition, in the case of this exemplary embodiment, a further informational content is contained in the pixel distribution. This is so because the irregular diffraction structure, running obliquely from bottom left to top right, is formed as a computer-generated hologram. Therefore, the information contained in the hologram, which is represented in FIG. 5c, can be obtained by reading out with the aid of a laser beam for example. The data bit patterns obtained correspond to the patterns represented in FIGS. 2b and 4b.

An optimization of the pixel distributions of dot matrix holograms according to the invention is explained in more detail below on the basis of three exemplary embodiments.

Firstly, reference is made to FIGS. 6a to 6h. The first steps according to FIGS. 6a to 6f correspond in this case to the method steps previously explained, in order to produce a computer-generated dot matrix hologram in combination with a computer-generated hologram.

Figure 6A:
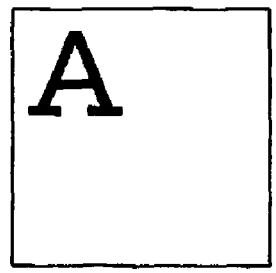
FIGS. 6a–h show a first exemplary embodiment of an iterative optimization of a dot matrix hologram according to the invention.
Figure 6B:
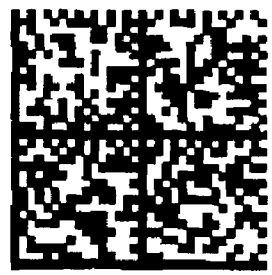
Figure 6C:
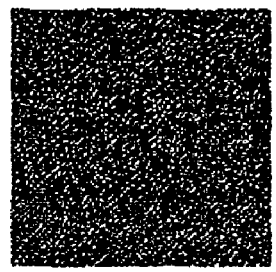
Figure 6D:
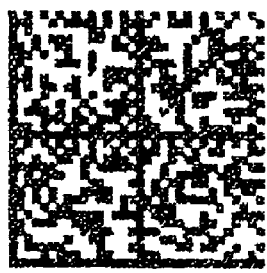

Firstly, the desired reconstruction is defined, FIG. 6a. Similarly, the dot matrix information is defined, FIG. 6b. The pixel distribution to be calculated for the desired reconstruction is represented in FIG. 6c. The combination of the dot matrix information and the pixel distribution is further represented in FIG. 6d.

Figure 6E:
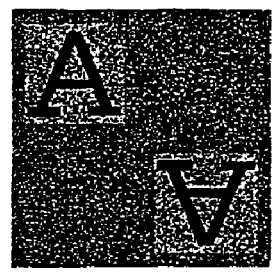
Figure 6F:
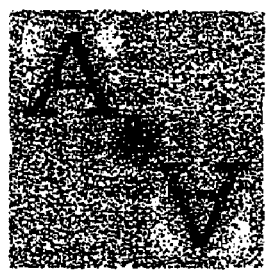

FIG. 6e shows the reconstruction of the hologram corresponding to the pixel distribution according to FIG. 6c. Furthermore, FIG. 6f shows the reconstruction of the pixel distribution according to FIG. 6d, the loss of information already explained above being clear in the comparison between FIGS. 6e and 6f.

In the subsequent optimization of the pixel distribution, the later form of the hologram corresponding to the dot matrix information is also included in the calculation. In this case, an iterative Fourier transformation algorithm is used, here preferably the gradual and random binarization algorithm. Iterative Fourier transformation algorithms go back and forth between the level of the hologram and the level of the reconstruction, i.e. the respective intensity distributions are calculated by forwardly and backwardly directed sweeps of the beam. In this case, the following different operations are used at the two levels. For the calculation of quantized holograms, a quantization operation is used at the level of the hologram. At the level of the reconstruction, the reconstruction obtained is replaced in a signal window by the desired reconstruction.

Figure 6G:
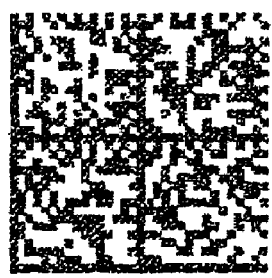

During the optimization for the dot matrix hologram represented in FIG. 6g, the form of the hologram is also included in the algorithm. This is carried out at the level of the hologram along with the quantization operation as a further operation.

Figure 6H:
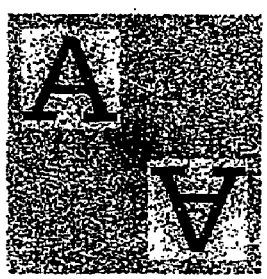
Figure 7A:
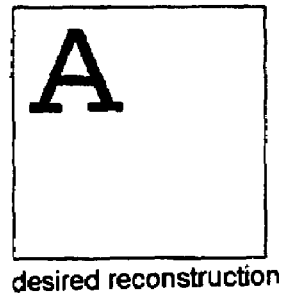
FIGS. 7a–h show a second exemplary embodiment of an iterative optimization of a dot matrix hologram according to the invention.
Figure 7B:
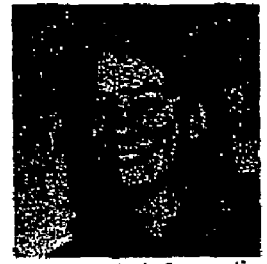
Figure 7C:
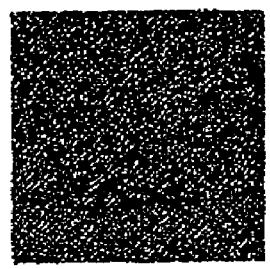
Figure 7D:
Figure 7E:
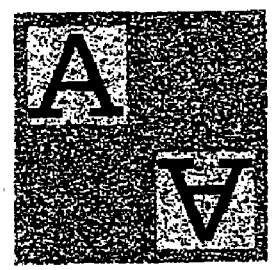
Figure 7F:
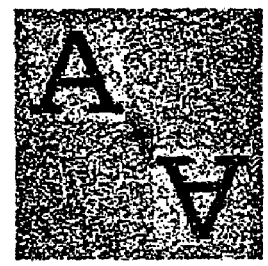
Figure 7G:
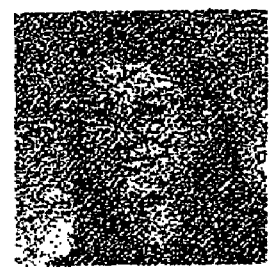
Figure 7H:
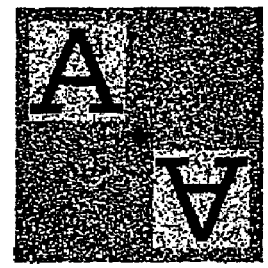

FIG. 6g shows the result of the optimization in the form of the optimized pixel distribution, while FIG. 6h shows the reconstruction of the optimized pixel distribution. The improved quality of the reconstruction is clear from a comparison between FIGS. 6f and 6h. Furthermore, the dot matrix information can be seen in the pixel distribution in the same way as in FIG. 6d before the optimization.

FIG. 7 shows a further example of the optimization explained above on the basis of an illustration of a photograph instead of the 2D barcode as dot matrix information. The sequence of FIGS. 7a to 7h corresponds to the sequence of FIGS. 6a to 6h, so that reference can be made to the description given above.

FIG. 8 shows a third exemplary embodiment of an optimization of the pixel distribution, a second optimization step being used after the first optimization described above; the second step can be performed in a special case of the data matrix hologram, that is a combination of a 2D barcode dot matrix hologram with two different computer-generated holograms.

The data matrix hologram is based on the interference fringes of a hologram having a preferred direction, depending on the reconstruction. This is represented in FIGS. 8a and 8b for two different holograms 1 and 2. The corresponding reconstructions 1 and 2 are shown in FIGS. 8c and 8d.

For the data matrix hologram, two holograms with different preferred directions are combined, the dot matrix information of a 2D barcode according to FIG. 8e and its inversion according to FIG. 8f being used. This produces the combinations 1 and 2 with the holograms 1 and 2 according to FIGS. 8g and 8h. Wherever a pixel distribution reproducing the information of the hologram 1 is arranged in the combination 1, the combination 2 has empty areas, and vice versa.

Figure 8I:
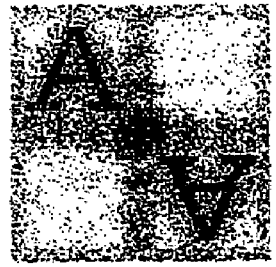
FIGS. 8a–z show a third exemplary embodiment of an iterative optimization of a dot matrix hologram according to the invention.
Figure 8J:
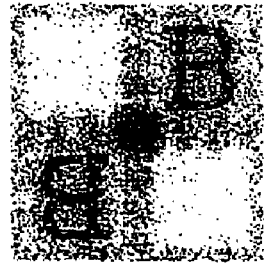

FIGS. 8i and 8j show the reconstructions for both combinations 1 and 2, the loss of information with respect to the reconstructions 1 and 2 according to FIGS. 8c and 8d being evident.

Figure 8K:
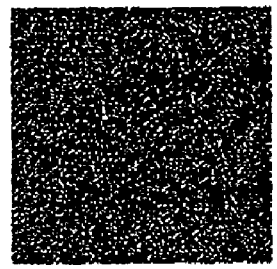
Figure 8L:
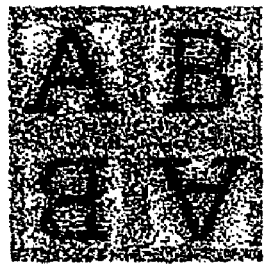

FIG. 8k shows the overall combination of the two combinations 1 and 2, which as already mentioned are complementary to each other. FIG. 8l then shows the reconstruction of the overall combination, the quality of the reconstruction substantially corresponding to the quality of the reconstructions of the individual combinations 1 and 2 according to FIGS. 8i and 8j.

In the next step, the first optimization, already described above, is carried out for each of the two combinations 1 and 2. The single optimization is based on the principle that the later form of the hologram is also included in the calculation. This produces the optimized holograms 1 and 2 according to FIGS. 8m and 8n, the respective reconstruction of which are represented in FIGS. 8o and 8p. In comparison with the reconstructions of the unoptimized combinations 1 and 2 according to FIGS. 8i and 8j, an improvement in quality is already evident in the form of better contrast and better resolution. The same result is obtained for the combination of the two optimized holograms 1 and 2, which is represented in FIG. 8q, the reconstruction of which is shown in FIG. 8r.

In the second optimization, on the basis of the first optimization, the entire hologram is calculated once again according to FIG. 8q. In this case, the reconstruction of the combination is taken as a basis and the hologram is calculated as a whole with the aid of the previously described iterative Fourier transformation. The resultant overall twice-optimized combination of the holograms 1 and 2 is represented in FIG. 8s. The associated reconstruction of the twice-optimized pixel distribution is shown in FIG. 8t, a clear increase in the quality being achieved once again in comparison with the reconstruction of the once-optimized pixel distribution according to FIG. 8r.

Figure 8M:
Figure 8N:
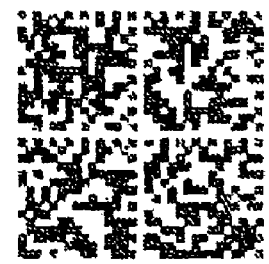
Figure 8O:
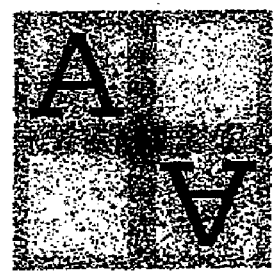
Figure 8P:
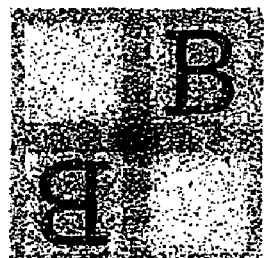
Figure 8Q:
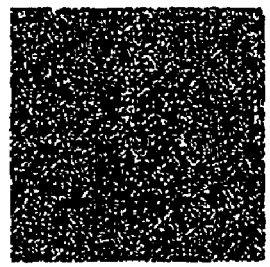
Figure 8R:
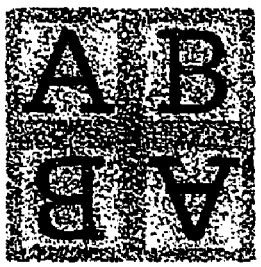
Figure 8S:
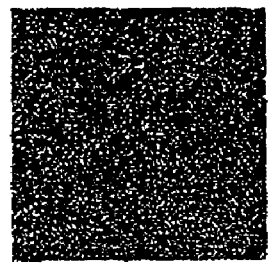
Figure 8T:
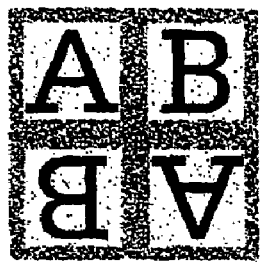
Figure 8U:
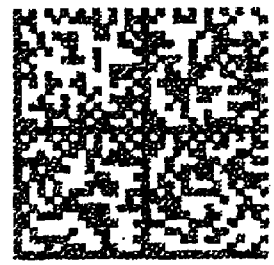
Figure 8V:
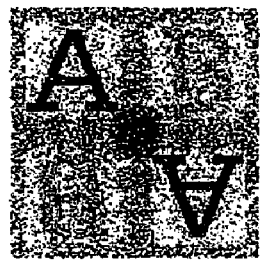
Figure 8W:
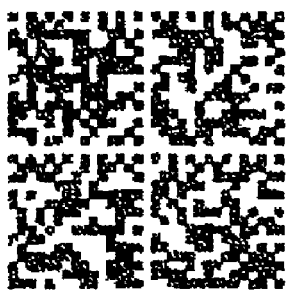
Figure 8X:
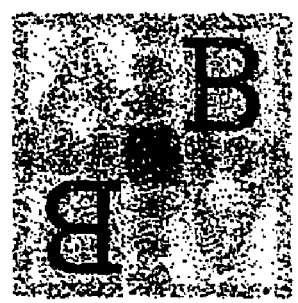

FIG. 8u shows the partial hologram extracted from the twice-optimized pixel distribution, corresponding to the once-optimized hologram 1 according to FIG. 8m. Its reconstruction is shown in FIG. 8v. Similarly, FIG. 8w shows the partial hologram extracted from the twice-optimized pixel distribution, corresponding to the once-optimized hologram 2 according to FIG. 8n. Its reconstruction is shown in FIG. 8x. In both reconstructions according to FIGS. 8v and 8x, the information of the other hologram can respectively be seen as a faint image. For example, in the top right-hand corner and the bottom left-hand corner of the reconstruction according to FIG. 8v there can be seen the letter B, which is not contained in the reconstruction of the once-optimized partial hologram according to FIG. 8o.

It is evident from this how the second optimization arises. There is a mixing of the items of information from the two holograms, which however leads to a clear improvement in quality. One partial hologram evidently corrects the residual error which is produced by the other partial hologram. The partial holograms therefore correct each other.

The preferred direction of the interference fringes is retained, however; therefore, in spite of joint optimization, the partial holograms can continue to be used for a computer-generated dot matrix hologram, in particular for a data matrix hologram.

Figure 8Y:
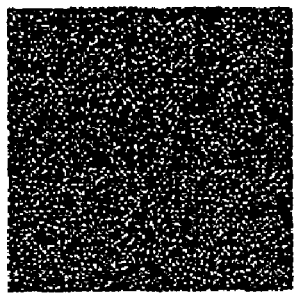
Figure 8Z:
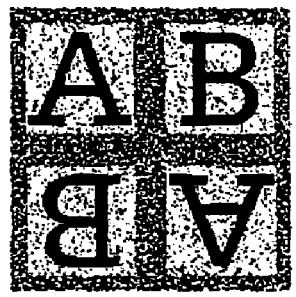

The second optimization produces results of very high quality. The quality of the resultant hologram is comparable to a normally optimized calculated hologram without data matrix information. This is shown by FIGS. 8y and 8z for such a calculation and associated reconstruction. If the reconstructions which are represented in FIG. 8t for the twice-optimized pixel distribution of a dot matrix hologram and in FIG. 8z for a pixel distribution of a "normal" computer-generated hologram are compared, only small differences in quality can be found. In spite of the virtually identical qualities of the reconstructions, the pixel distribution according to FIG. 8s however also additionally contains the dot matrix information of the 2D barcode on which it is based.

Figure 9:
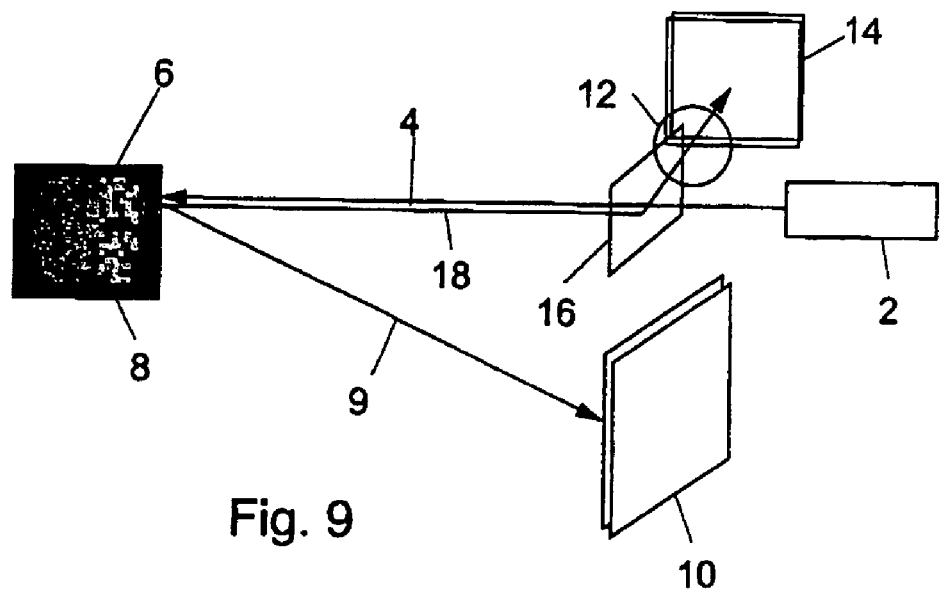
FIG. 9 shows a first exemplary embodiment of a device for reading out a hologram stored in a storage medium.

A first exemplary embodiment of a device for reading out a hologram stored in a storage medium is represented in FIG. 9. The device has a beam source 2 for producing a reading beam 4 of electromagnetic radiation. This is preferably visible radiation, but generally any type of electromagnetic radiation can be used.

A storage medium 6 is arranged in the path of rays of the reading beam 4, the reading beam 4 illuminating at least partly, preferably completely, the surface area 8 taken up by the hologram. For this purpose, the reading beam 4 is expanded by means of optics known per se (not represented) to such a width that the reading beam 4 has an adequate diameter. In FIG. 9 and in the other figures, the beams have been represented only as lines and arrows for simplicity. This also improves the overview. However, it is emphasized that these are purely schematic representations.

Furthermore, recording means 10 for recording the image produced by the hologram are provided in the path of rays of the beam 9 deflected by the hologram. These recording means are preferably a CCD array for direct recording and electronic further processing of the image information. Similarly, a screen on which the reconstruction of the hologram is represented may be used.

According to the invention, an optical system for capturing the pixel distribution of the surface area 8 taken up by the hologram is provided, whereby the macroscopic superstructure can be captured and evaluated.

In the present exemplary embodiment, the optical system has imaging optics in the form of a lens 12 and second recording means 14. In the same way as the first recording means 10 already, these second recording means may likewise be formed as a CCD array or as a screen.

The imaging optics 12 are intended for forming an image of the pixel distribution of the surface area 8 taken up by the hologram and the second recording means 14 serve for recording and further processing the pixel distribution from which the macroscopic superstructure is obtained.

As FIG. 9 shows, a beam splitter 16 is provided in the path of rays of the reading beam 4 for deflecting the reflected beam 18 onto the imaging optics 12. This arrangement is mainly used if the reading beam 4 is aligned substantially perpendicularly in relation to the surface of the storage medium 6 and the reflected beam 18 runs substantially antiparallel to the reading beam 4.

Figure 10:
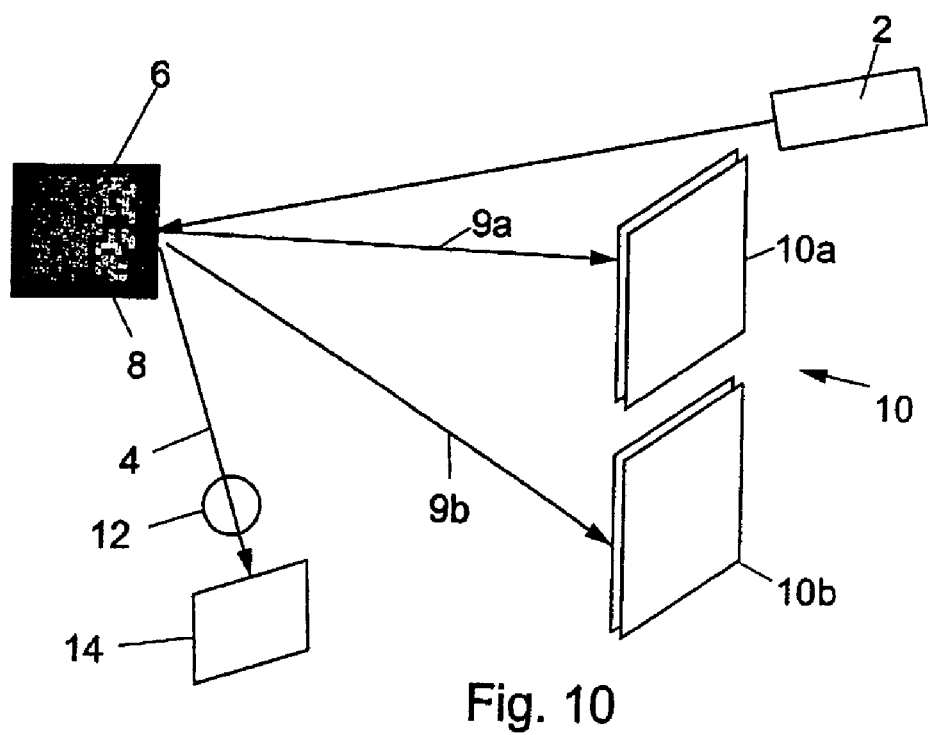
FIG. 10 shows a second exemplary embodiment of a device for reading out a hologram stored in a storage medium.

FIG. 10 shows a second exemplary embodiment of a device according to the invention for reading out a hologram stored in a storage medium 6, the same reference numerals identifying the same elements as in the case of the first exemplary embodiment.

The first recording means 10 have at least two recording regions 10a and 10b, which are separate from each other, for recording at least two spatially separate reconstructions of the hologram. The different reconstructions of one or two different computer-generated holograms can consequently be captured and evaluated separately.

It should be emphasized with respect to the second exemplary embodiment that one reading beam 4 is adequate for reading out all the information, that is both the macroscopic superstructure and two different items of holographic information.

Figure 11:
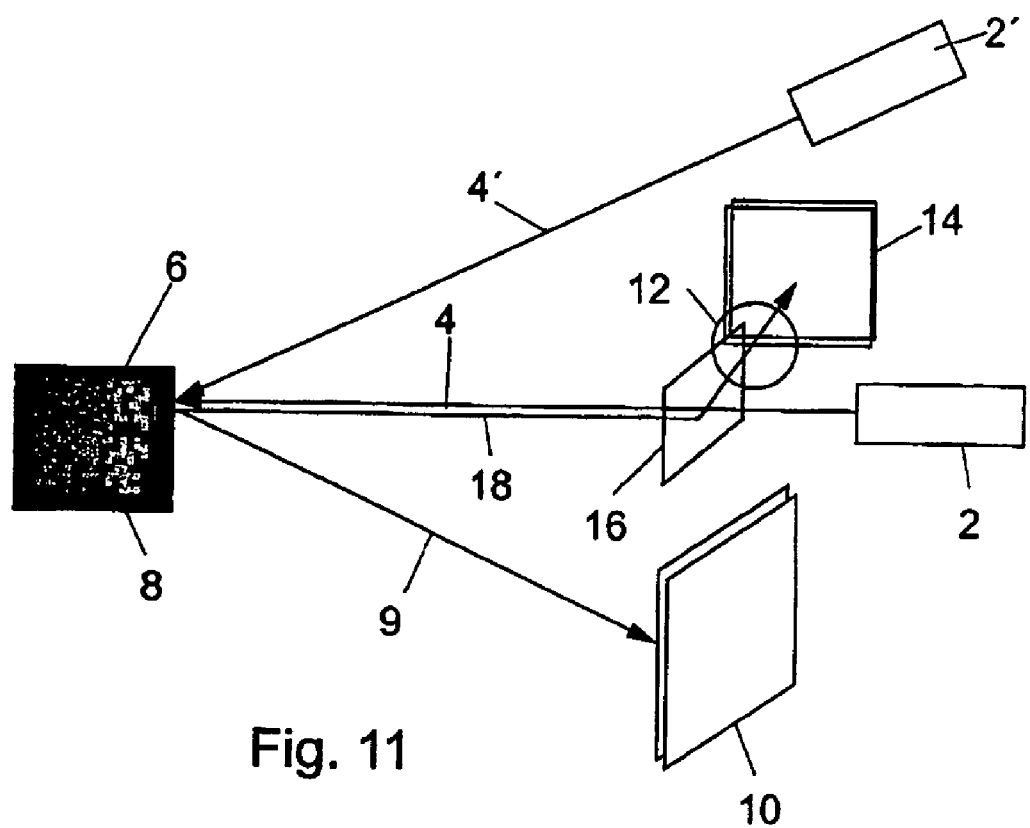
FIG. 11 shows a third exemplary embodiment of a device for reading out a hologram stored in a storage medium and FIG. 12 shows a fourth exemplary embodiment of a device for reading out a hologram stored in a storage medium.

FIG. 11 shows a third exemplary embodiment of a device according to the invention for reading out a hologram stored in a storage medium 6, the same reference numerals identifying the same elements as in the case of the first two exemplary embodiments.

In this exemplary embodiment, two different radiation sources 2 and 2' are provided, on the one hand intended for reading out the macroscopic superstructure and on the other hand making it possible for the holographic information to be read out. For this purpose, two, preferably expanded, reading beams 4 and 4' are directed at the pixel distribution 8 written in the storage medium 6. The constructions already described above which belong to the recording means 10 and 14 are then used in a corresponding way. The advantage of this construction is that the reading beams 4 and 4' can in each case be set up optimally for the reading conditions for reading out the macroscopic superstructure and the holographic information, in particular with respect to the angle of incidence. It is preferred in this respect for the reading beam for reading out the macroscopic superstructure to be set in such a way that for example a particularly high-contrast image of the surface areas of a 2D barcode is formed on the recording means.

The additional radiation source may also be used in comparison with the first exemplary embodiment for reading out a second hologram. In this case, not represented in the figures, two recording means are provided for recording holographic information, a first recording means recording the reconstruction by the first reading beam and the second recording means recording the reconstruction by the second reading beam.

Figure 12:
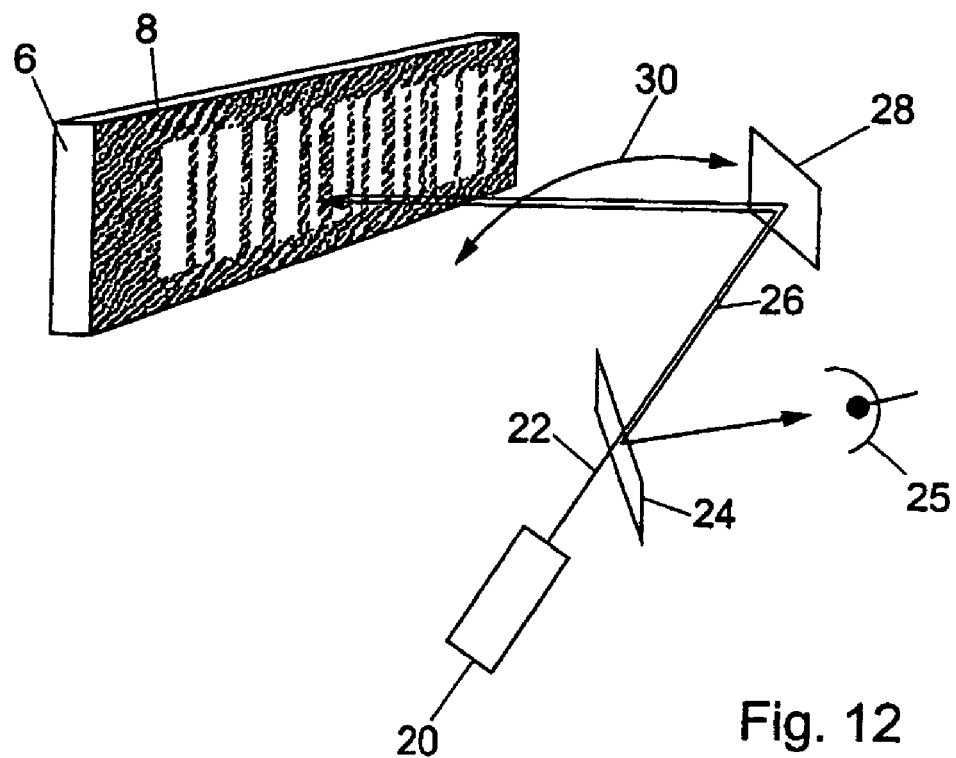

FIG. 12 shows a fourth exemplary embodiment of a device according to the invention for reading out a hologram stored in a storage medium, the same reference numerals identifying the same elements as in the case of the first three exemplary embodiments.

The pixel distribution written in on the storage medium has a 1D barcode as the macroscopic superstructure, which has alternately light or white strips and darker strips, containing the holographic information. The one-dimensional information can be captured by scanning with a reading beam in the conventional way; therefore, all forms of barcode reading devices that are known from the prior art come into consideration for this task.

The optical construction for reading out the holographic information, which, as in the previous exemplary embodiments described, comprises the radiation source 2, the expanded reading beam 4 and the recording means 10, has been omitted in the representation of FIG. 12. On the other hand, the further construction of the optical system for the barcode scanner is represented.

The optical system has a second radiation source 20 for producing a second reading beam 22 of electromagnetic radiation. A beam splitter 24, which directs the reflected beam 26 onto a light-sensitive detector 25, is arranged in the path of rays of the second reading beam 22.

In principle, this construction is sufficient to read the 1D barcode when the storage medium is moved transversely in relation to the second reading beam.

Furthermore, a scanning device in the form of a scanning mirror 28 may also be provided, the scanning mirror 28 being intended for scanning the second reading beam 22 over the pixel distribution of the surface area 8 taken up by the hologram. The scanning movement is represented by the double-headed arrow 30 and runs substantially perpendicularly in relation to the lines of the 1D barcode of the macroscopic superstructure.

The invention claimed is:

1. A method for calculating a computer-generated hologram,
   in which the pixel distribution of at least one computer-generated hologram is calculated, the surface of said at least one computer-generated hologram containing no directly visible information,
   in which the pixel distribution of a macroscopic superstructure is calculated, said macroscopic superstructure containing directly visible information, and
   in which the pixel distribution of the at least one computer-generated hologram is interconnected with the pixel distribution of the macroscopic superstructure to form one shared pixel distribution to be written in a storage medium.

2. The method as claimed in claim 1, in which the macroscopic superstructure takes the form of a 1D or 2D barcode, a microinscription, an image, a logo, a coded matrix or a mixture of at least two of the aforementioned types of superstructure.

3. The method as claimed in claim 1, in which a logic operation is used between the pixel distribution of the at least one computer-generated hologram and the pixel distribution of the macroscopic superstructure, leading either to setting or omission of the pixels of the pixel distributions or to a conversion of the pixels into gray scale values.

4. The method as claimed in claim 3, in which an AND, NAND, OR or NOR operation is used.

5. The method as claimed in claim 3, in which the pixel distribution of the at least one computer-generated hologram has a first preferred angular alignment, in which the pixel distribution of the macroscopic superstructure has at least a second preferred angular alignment and in which the pixel distribution of the hologram at the regions filled by the pixel distribution of the macroscopic superstructure is replaced by the latter.

6. The method as claimed in claim 5, in which the pixel distribution of the macroscopic superstructure itself has at least partly a pixel distribution of a further computer-generated hologram.

7. The method as claimed in claim 3, in which the pixel distribution of the macroscopic superstructure is calculated as a computer-generated dot matrix hologram and in which, as the interconnection, the pixel distribution of the hologram at the regions filled by the pixel distribution of the higher-level structure is replaced by the latter.

8. The method as claimed in claim 7, in which the structure of the computer-generated dot matrix hologram is produced by different forms or grating structures of the individual dots.

9. The method as claimed in claim 1, in which an iterative Fourier transformation algorithm, preferably a gradual and random binarization algorithm, is used for an optimization of the pixel distribution.

10. The method as claimed in claim 9, in which a quantization operation is used at the level of the pixel distribution of the hologram.

11. The method as claimed in claim 9, in which a clipping of the pixel distribution to the intended form within the entire pixel distribution is performed at the level of the pixel distribution of the hologram.

12. The method as claimed in claim 9, in which, at the level of the reconstruction, the reconstruction obtained from the iteration step last carried out is replaced by the desired reconstruction.

13. The method as claimed in claim 9, in which the optimized composed pixel distribution form at least two different holograms is optimized once again by an iterative Fourier transformation algorithm, the entire pixel distribution being assumed at the level of the pixel distribution and the reconstruction of the combination being assumed at the level of the reconstruction.

14. A method for producing a computer-generated hologram in a storage medium,
   in which the at least one computer generated hologram is calculated as claimed in claim 1,
   in which a writing beam is focused on the storage medium and is moved two-dimensionally in relation to the storage medium and
   in which the pixel distribution to be written is written by introducing radiation energy on a point by point basis, the intensity of the writing beam being controlled in dependence on the position of the writing beam on the storage medium.

15. The method as claimed in claim 14, in which at least some of the pixels of the pixel distribution are exposed in a binary distribution or a gray scale value distribution.

16. The method as claimed in claim 14, in which the writing beam is moved in relation to a fixed storage medium.

17. The method as claimed in claim 14, in which the medium to be written on is moved, with the writing beam fixed.

18. The method as claimed in claim 14, in which at least two different dot matrix holograms are written in the storage medium at different point in time.

19. A storage medium
   with at least one region into which a pixel distribution is written,
   the pixels of the pixel distribution having a changed optical property of the material of the storage medium in comparison with the original state and
   the pixel distribution having been produced by a method as claimed in claim 14.

20. The storage medium as claimed in claim 19, wherein the pixel distribution is written in the surface of the material of the storage medium.

21. The storage medium as claimed in claim 19, wherein the pixel distribution is written beneath the surface of the material of the storage medium.

22. The storage medium as claimed in claim 19, wherein at least two pixel distributions are written at at least two different levels in the material of the storage medium.

23. A device for reading out a hologram stored in a storage medium as claimed in claim 19,
   with a radiation source for producing a reading beam of electromagnetic radiation,
   with the storage medium arranged in the path of rays of the reading beam, the reading beam at least partly illuminating the surface area taken up by the hologram, and
   with recording means for recording the image produced by the hologram,
   wherein an optical system is provided for capturing the macroscopic superstructure of the pixel distribution of the surface area taken up by the hologram.

24. The device claimed in claim 23,
   wherein the optical system has imaging optics and second recording means,
   wherein the imaging optics are intended for forming an image of the pixel distribution of the surface area taken up by the hologram and, wherein the second recording means are intended for recording the macroscopic superstructure for the pixel distribution.

25. The device as claimed in claim 24, wherein a beam splitter is provided in the path of rays of the reading beam for deflecting the reflected beam onto the imaging optics.

26. The device as claimed in claim 23 wherein the first recording means has at least two recording regions which are separate from each other, for recording at least two different images of the hologram.

27. The device as claimed in claim 23,
wherein the optical system has a second radiation source for producing a second reading beam of electromagnetic radiation, a beam splitter arranged in the path of rays of the second reading beam between the radiation source and a light-sensitive detector the beam splitter being intended for deflecting the beam reflected from the surface of the storage medium onto the light-sensitive detector.

28. The device as claimed in claim 27, wherein a scanning device is arranged in the path of rays between the beam splitter and the storage medium, the scanning device being provided for scanning the second reading beam over the pixel distribution of the surface area taken up by the hologram.

* * * * *